US012810206B2

(12) United States Patent
Hong et al.

(10) Patent No.: US 12,810,206 B2
(45) Date of Patent: Nov. 24, 2026

(54) METHOD AND APPARATUS FOR LEARNING OF NOISE LABEL BASED ON TEST-TIME AUGMENTED CROSS-ENTROPY AND NOISE MIXING

(71) Applicants: SEOUL WOMEN'S UNIVERSITY INDUSTRY-UNIVERSITY COOPERATION FOUNDATION, Seoul (KR); KOREA ADVANCED INSTITUTE OF SCIENCE AND TECHNOLOGY, Daejeon (KR)

(72) Inventors: Helen Hong, Seoul (KR); Hansang Lee, Daejeon (KR)

(73) Assignees: SEOUL WOMEN'S UNIVERSITY INDUSTRY-UNIVERSITY COOPERATION FOUNDATION, Seoul (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 569 days.

(21) Appl. No.: 18/466,374

(22) Filed: Sep. 13, 2023

(65) Prior Publication Data

US 2024/0086772 A1 Mar. 14, 2024

(30) Foreign Application Priority Data

Sep. 14, 2022 (KR) ........................ 10-2022-0115336

(51) Int. Cl.
*G06N 20/00* (2019.01)
*G06F 16/215* (2019.01)

(52) U.S. Cl.
CPC ........... *G06N 20/00* (2019.01); *G06F 16/215* (2019.01)

(58) Field of Classification Search
CPC .......... G06N 20/00; G06N 3/047; G06N 3/08; G06N 3/094; G06F 16/215
See application file for complete search history.

(56) References Cited

U.S. PATENT DOCUMENTS

| | | | | |
|---|---|---|---|---|
| 11,663,486 | B2 * | 5/2023 | Sun | G06F 18/2113 706/12 |
| 2021/0089883 | A1 * | 3/2021 | Li | G06N 3/08 |
| 2021/0357776 | A1 * | 11/2021 | Quader | G06N 20/20 |
| 2021/0374553 | A1 * | 12/2021 | Li | G06N 3/088 |

(Continued)

FOREIGN PATENT DOCUMENTS

KR 10-2362872 B1 2/2022

OTHER PUBLICATIONS

Wang, Yisen et al., Iterative Learning with Open-set Noisy Labels, Cornell University, Computer Vision and Pattern Recognition , arXiv:1804.00092 [cs.CV] 2018 (Year: 2018).*

(Continued)

*Primary Examiner* — Barbara M Level
(74) *Attorney, Agent, or Firm* — Studebaker Brackett PLLC

(57) ABSTRACT

Disclosed is a method and apparatus for learning a noise label based on test-time augmented cross entropy and noise mixing. The method includes obtaining noisy training data including clean label data and label noise data, selecting label noise for searching for mislabeled data by separating the clean label data and the label noise data from the noisy training data, and learning a classifier by mixing the noisy training data and the clean label data at a predetermined ratio.

12 Claims, 11 Drawing Sheets

(56) References Cited

U.S. PATENT DOCUMENTS

| | | | | |
|---|---|---|---|---|
| 2022/0067506 | A1* | 3/2022 | Li | G06V 10/7753 |
| 2023/0196184 | A1* | 6/2023 | Dong | G06N 3/09<br>706/12 |
| 2023/0267713 | A1* | 8/2023 | Ishizaka | G06V 10/776 |
| 2026/0051100 | A1* | 2/2026 | Schlemper | G06N 3/045 |

OTHER PUBLICATIONS

Li et al.; "DivideMix: Learning with Noisy Labels as Semi-supervised Learning"; Conference Paper; Feb. 18, 2020; pp. 1-14; International Conference on Learning Representations; URL: https://iclr.cc/virtual_2020/poster_HJgExaVtwr.html.

Office Action issued in KR 10-2022-0115336; mailed by the Korean Intellectual Property Office on Sep. 24, 2025.

* cited by examiner (a) r = 10%

(b) r = 30%

(c) r = 50%

METHOD AND APPARATUS FOR LEARNING OF NOISE LABEL BASED ON TEST-TIME AUGMENTED CROSS-ENTROPY AND NOISE MIXING

CROSS-REFERENCE TO RELATED APPLICATIONS

A claim for priority under 35 U.S.C. § 119 is made to Korean Patent Application No. 10-2022-0115336 filed on Sep. 14, 2022 in the Korean Intellectual Property Office, the entire contents of which are hereby incorporated by reference.

BACKGROUND

Embodiments of the inventive concept described herein relate to a noise label learning method, and more particularly, relate to a method and apparatus for learning a noise label based on test-time augmented cross entropy and noise mixing.

A machine learning apparatus may perform training not only on correctly labeled data but also on mislabeled data.

In the meantime, as a size of a data set used in a deep learning task increases, the possibility of including label noise data that is mislabeled may increase.

For example, because large medical imaging data sets are often automatically labeled, image data sets may include label noise data.

In this case, errors in learning outcomes may lead to a variety of problems, which may make learning results unreliable.

As a result, related technical operators have sought ways to reduce label noise to make accurate predictions on training data applied to machine learning.

There is a prior art disclosed as Korean Registered Patent Publication No. 10-2362872. (2022 Feb. 9)

SUMMARY

Embodiments of the inventive concept provide a method and apparatus for learning a noise label based on test-time augmented (TTA) cross-entropy and noise mixing (Noise-mix) that may measure cross-entropy and may apply TTA cross-entropy for predicting test-time augmented training data and noise mixing learning for mixing samples of noisy training data and clean label data, thereby improving learning performance on label data containing noise.

Problems to be solved by the inventive concept are not limited to the problems mentioned above, and other problems not mentioned will be clearly understood by those skilled in the art from the following description.

According to an embodiment, a noise label learning method performed by an apparatus includes obtaining noisy training data including clean label data and label noise data, selecting label noise for searching for mislabeled data by separating the clean label data and the label noise data from the noisy training data, and learning a classifier by mixing the noisy training data and the clean label data at a predetermined ratio. The selecting of the label noise includes training a weak classifier for the noisy training data, calculating a prediction score by predicting augmented training data by using the weak classifier, and selecting label noise data from the noisy training data depending on the prediction score. The prediction score for separating the clean label data and the label noise data is test-time augmentation cross entropy.

According to an embodiment, a noise label learning apparatus includes a processor, and a memory that stores a program executed by the processor. The processor obtains noisy training data including clean label data and label noise data, selects label noise for searching for mislabeled data by separating the clean label data and the label noise data from the noisy training data, learns a classifier by mixing the noisy training data and the clean label data at a predetermined ratio, training a weak classifier for the noisy training data when selecting the label noise, calculating a prediction score by predicting augmented training data by using the weak classifier, and selecting label noise data from the noisy training data depending on the prediction score. The prediction score for separating the clean label data and the label noise data is test-time augmentation cross entropy.

Besides, a computer program stored in a computer-readable recording medium for executing a method to implement the inventive concept may be further provided.

In addition, a computer-readable recording medium for recording a computer program for performing the method for implementing the inventive concept may be further provided.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
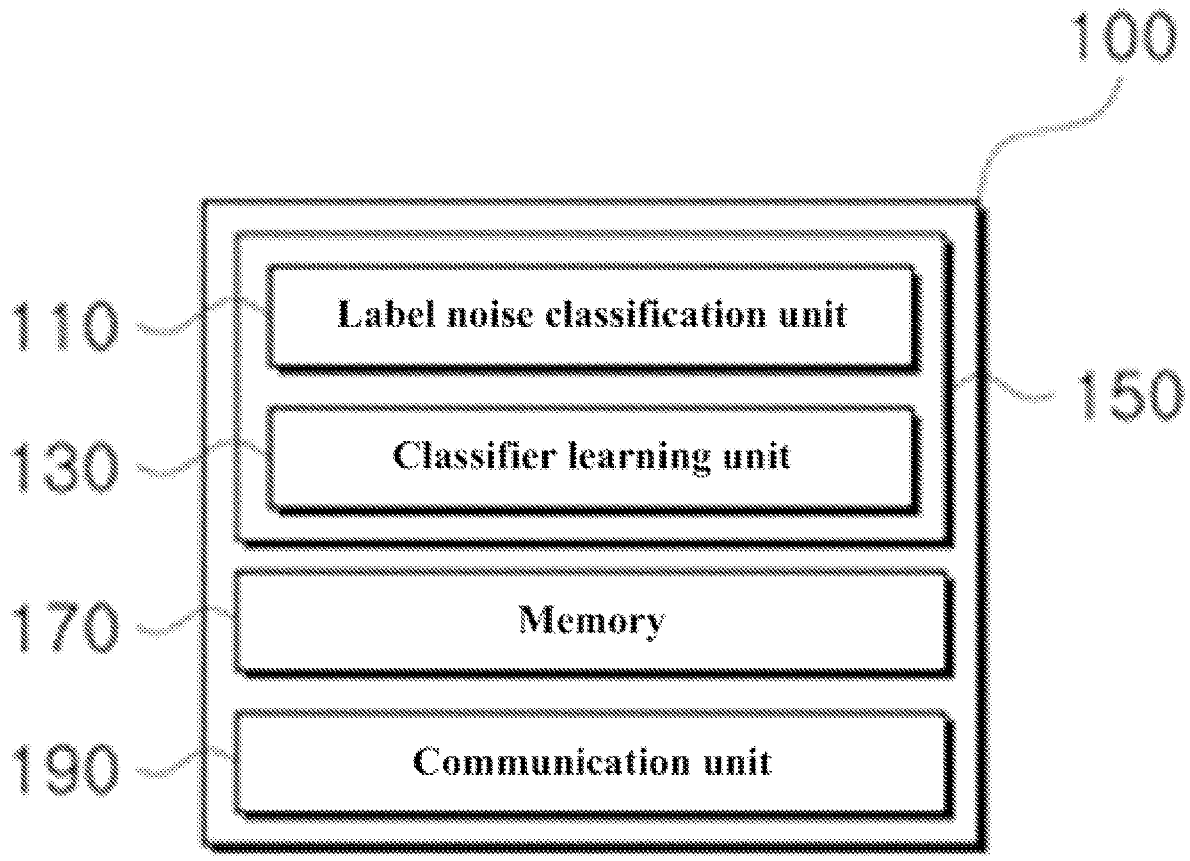
FIG. 1 is a block diagram of a noise label learning apparatus, according to an embodiment of the inventive concept.

The same reference numerals denote the same elements throughout the inventive concept. The inventive concept does not describe all elements of embodiments. Well-known content or redundant content in which embodiments are the same as one another will be omitted in a technical field to which the inventive concept belongs. A term such as 'unit, module, member, or block' used in the specification may be implemented with software or hardware. According to embodiments, a plurality of 'units, modules, members, or blocks' may be implemented with one component, or a single 'unit, module, member, or block' may include a plurality of components.

Throughout this specification, when it is supposed that a portion is "connected" to another portion, this includes not only a direct connection, but also an indirect connection. The indirect connection includes being connected through a wireless communication network.

Furthermore, when a portion "comprises" a component, it will be understood that it may further include another component, without excluding other components unless specifically stated otherwise.

Throughout this specification, when it is supposed that a member is located on another member "on", this includes not only the case where one member is in contact with another member but also the case where another member is present between two other members.

Terms such as 'first', 'second', and the like are used to distinguish one component from another component, and thus the component is not limited by the terms described above.

Unless there are obvious exceptions in the context, a singular form includes a plural form.

In each step, an identification code is used for convenience of description. The identification code does not describe the order of each step. Unless the context clearly states a specific order, each step may be performed differently from the specified order.

Hereinafter, operating principles and embodiments of the inventive concept will be described with reference to the accompanying drawings.

In this specification, a 'noise label learning apparatus according to an embodiment of the inventive concept' includes all various devices capable of providing results to a user by performing arithmetic processing. For example, according to an embodiment of the inventive concept, a noise label learning apparatus may include all of a computer, a server device, and a portable terminal, or may be in any one form.

Here, for example, the computer may include a notebook computer, a desktop computer, a laptop computer, a tablet PC, a slate PC, and the like, which are equipped with a web browser.

The server device may be a server that processes information by communicating with an external device and may include an application server, a computing server, a database server, a file server, a game server, a mail server, a proxy server, and a web server.

For example, the portable terminal may be a wireless communication device that guarantees portability and mobility, and may include all kinds of handheld-based wireless communication devices such as a smartphone, a personal communication system (PCS), a global system for mobile communication (GSM), a personal digital cellular (PDC), a personal handyphone system (PHS), a personal digital assistant (PDA), International Mobile Telecommunication (IMT)-2000, a code division multiple access (CDMA)-2000, W-Code Division Multiple Access (W-CDMA), and Wireless Broadband Internet terminal (Wibro) terminal, and a wearable device such as a timepiece, a ring, a bracelet, an anklet, a necklace, glasses, a contact lens, or a head-mounted device (HMD).

FIG. 1 is a block diagram of a noise label learning apparatus, according to an embodiment of the inventive concept.

Hereinafter, a noise label learning method according to an embodiment of the inventive concept will be described with reference to FIG. 2, which is an exemplary diagram for schematic descriptions, and FIG. 3, which is an exemplary diagram for describing a method of selecting label noise according to an embodiment of the inventive concept.

Referring to FIG. 1, a label noise learning apparatus 100 includes a processor 150, a memory 170, and a communication unit 190. In this case, the processor 150 may include a label noise classification unit 110 and a classifier learning unit 130, and may control an operation of each component. The components shown in FIG. 1 are not essential in implementing a noise label learning apparatus according to an embodiment of the inventive concept. The noise label learning apparatus described herein may have more or fewer components than those listed above.

According to an embodiment of the inventive concept to be described later, a test-time augmentation cross entropy for selecting label noise, and a noise mixing (Noisemix) method for learning a classifier may be applied.

Figure 2:
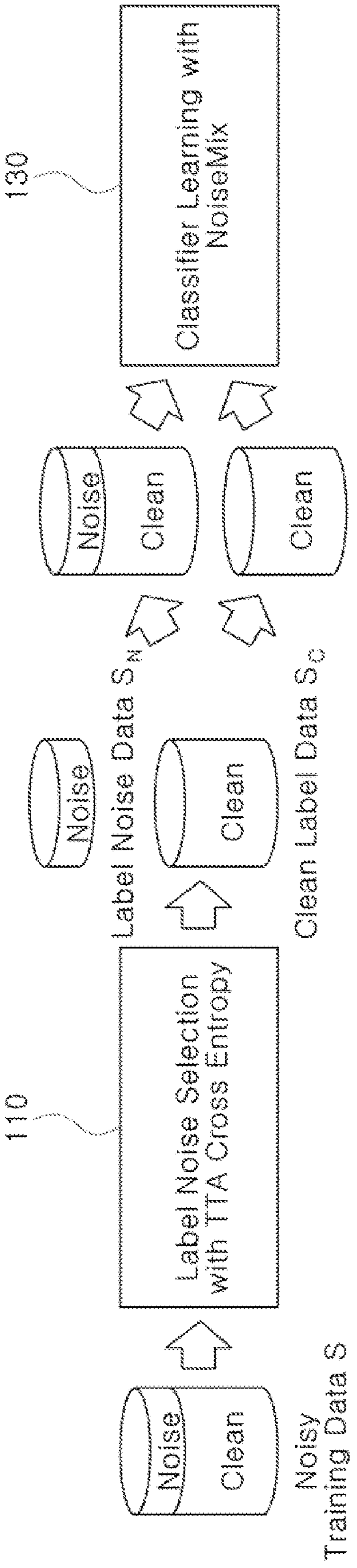
FIG. 2 is a diagram for schematically describing a noise label learning method, according to an embodiment of the inventive concept.

Referring to FIG. 2, the processor 150 may obtain noisy training data including clean label data and label noise data. The label noise data S N may refer to mislabeled data. The clean label data $S_C$ may refer to data that is correctly labeled.

In this case, the noisy training data S may refer to label data (i.e., label data including a lot of label noise data) including mislabeled noise that is input to the label noise classification unit 110 of the processor 150 for learning.

When selecting label noise by using test-time augmentation cross entropy, the processor 150 may perform a label noise selection procedure of separating clean label data $S_C$ and label noise data S N from noisy training data "$S=\{S_N, S_C\}$" and searching for mislabeled data.

Figure 3:
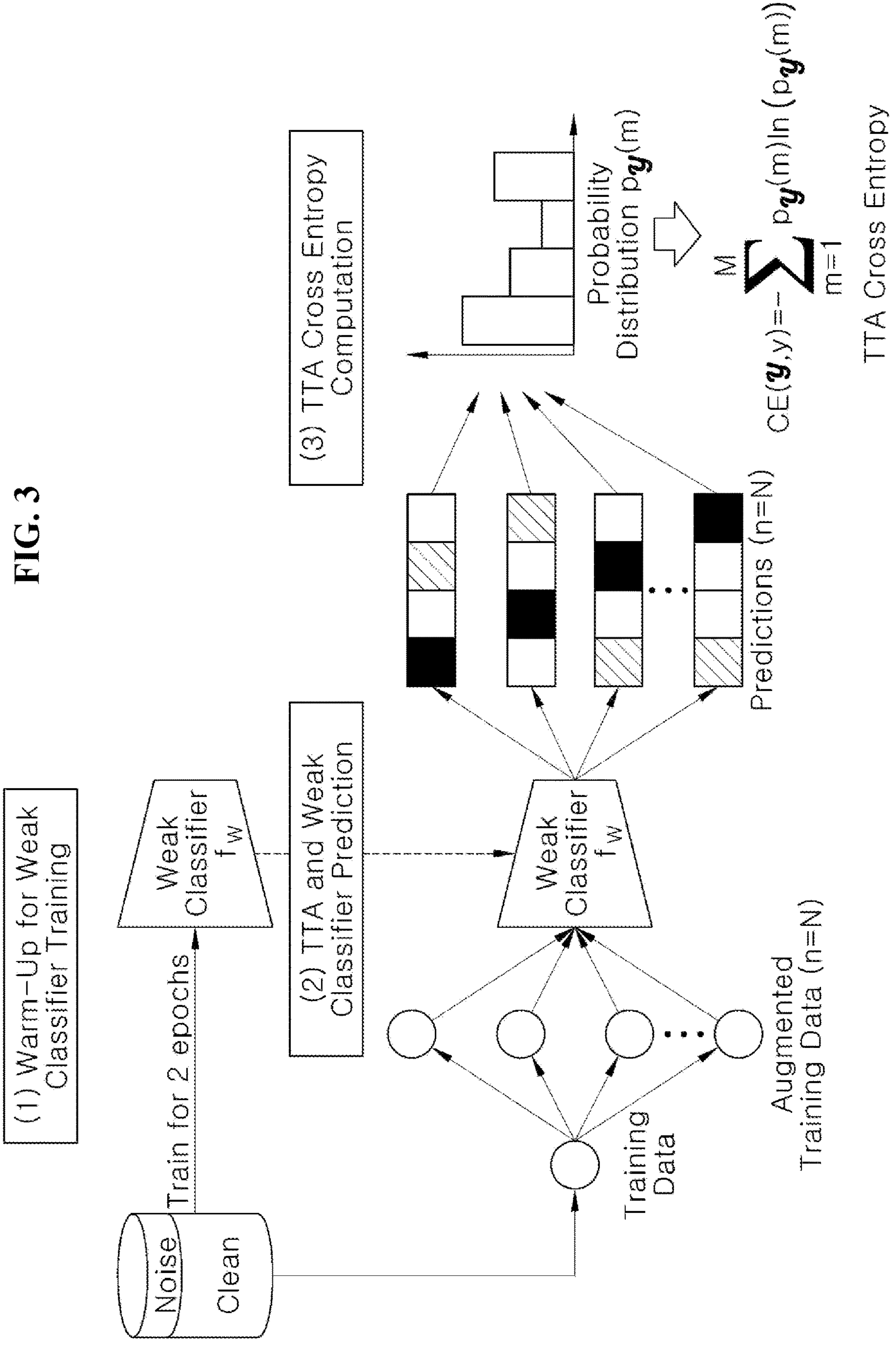
FIG. 3 is a diagram for schematically describing a method of selecting label noise in detail, according to an embodiment of the inventive concept.

Referring to FIG. 3, the label noise selection procedure may include (1) warm-up for weak classifier training, (2) TTA and weak classifier prediction, and (3) TTA cross entropy computation.

The processor 150 may train a weak classifier on noisy training data, may predict augmented training data by using the trained weak classifier, may calculate a prediction score by using weak classifier prediction of augmented training data, and may select label noise data from noisy training data depending on the calculated prediction score. In this case, the prediction score for separating clean label data and label noise data may be test-time augmentation cross entropy.

In detail, when selecting the label noise data, the processor 150 may perform warm-up for training of a weak classifier to obtain the prediction score of noisy training data. In this case, when performing the warm-up for training of the weak classifier, the processor 150 may train the noisy training data for a predetermined number (e.g., 2 epochs in FIG. 3) of epochs. This may be intended to prevent a weak classifier fw( ) from being overfitted to a classifier due to incorrect label noise. Here, one epoch means that an artificial neural network performs a forward pass/backward pass process on the entire data set, and may refer to a state where learning is completely made once on the entire data set.

Moreover, the processor 150 may calculate the prediction score of noisy training data for separating label noise data and clean label data by using a trained weak classifier.

In this case, when calculating the prediction score of noisy training data, the processor 150 may perform prediction of a weak classifier based on augmented training data included in the noisy training data through affine transformation-based test-time augmentation. This is intended to prevent the weak classifier from still remembering label noise data even after the above-mentioned warm-up process.

In other words, to avoid the memorization problem of the weak classifier, the weak classifier prediction is performed on augmented training data through test-time augmentation based on an affine transformation, not the noisy training data itself.

When performing the prediction of a weak classifier based on the augmented training data described above, the processor 150 may form a set ($x=\{x_1, x_2, \ldots, x_N\}$) of augmented training data by using an affine transformation TO from image label pair ((x, y)∈S) of the noisy training data. This may be expressed based on Equation 1.

$$x_n = T(x, \theta_n) \quad \text{[Equation 1]}$$

In this case, $x_n$ may denote the n-th augmented training data. $\theta_n$ may denote the n-th parameter for an affine transformation.

Moreover, the processor 150 may obtain a predicted label set ($y=\{y_1, y_2, \ldots, y_N\}$) by performing the prediction of a weak classifier based on the set of augmented training data. This may be expressed based on Equation 2.

$$y_n = f_w(x_n) \quad \text{[Equation 2]}$$

In this case, $y_n$ may be the n-th prediction label of augmented training data.

The processor 150 may obtain test-time augmentation cross entropy for distinguishing between label noise data and clean label data based on the prediction score of the calculated noisy training data. The prediction score of the noisy training data may be a prediction score using weak classifier prediction of the augmented training data.

That is, the processor 150 may calculate a prediction score by using weak classifier prediction of augmented training data, and may select label noise data from noisy training data depending on the prediction score.

In the meantime, label instability in weak classifier prediction of augmented training data may be identified based on Equation 3 by forming a probability distribution $p_y$ of unique labels (m=1, 2, . . . , M) for the predicted label set of augmented training data (Y). In this case, $p_y(m)$ may be a ratio of the number of $y_n$ with label m among N predicted labels. The uncertainty of conventional test-time augmentation for the probability distribution $p_y$ may be calculated as the entropy of the distribution.

$$H(\mathcal{Y}) = -\sum_{m=1}^{M} p_{\mathcal{Y}}(m)\ln(p_{\mathcal{Y}}(m)) \quad \text{[Equation 3]}$$

The uncertainty of the test-time augmentation described above only evaluates the instability of the label prediction of the augmented training data, not whether the training label is correct or incorrect. Accordingly, the case where the label is inaccurate but label uncertainty is relatively low may be missed.

According to an embodiment of the inventive concept, test-time augmentation cross entropy, which reflects the accuracy of the training label for the uncertainty of test-time augmentation, may be applied to overcome the above-mentioned limitations to be described later.

In particular, when obtaining test-time augmentation cross entropy, the processor 150 may determine the accuracy of the training label of the noisy training data by forming a probability distribution of the unique label for training labels of the noisy training data. This may be expressed based on Equation 4.

$$CE(\mathcal{Y}, y) = -\sum_{m=1}^{M} p_y(m)\ln(p_{\mathcal{Y}}(m)) \quad \text{[Equation 4]}$$

In this case, $p_y$ may be the probability distribution of the unique label for training labels (y) of the noisy training data. Here, when the training label (y) is 'In', $P_y(m)$ may be 1. When the training label (y) is not 'm', $P_y(m)$ may be 0.

Through the above-described process, the test-time augmentation cross entropy according to an embodiment of the inventive concept may consider both the label instability of weak classifier prediction of augmented training data and the accuracy of the training data label. For this reason, according to an embodiment of the inventive concept, the efficiency of label noise selection may be improved compared to general training data cross-entropy and test-time augmentation uncertainty.

The processor 150 may learn a classifier by mixing noisy training data and clean label data at a predetermined ratio. In this case, the processor 150 may form mixed training data by applying a noise mixing technique (Noisemix method) of mixing clean label data and noisy training data, which are separated through label noise selection. In other words, according to an embodiment of the inventive concept, the learning efficiency of a clean label data learner may be improved by using label noise data while overfitting for label noise is prevented.

During the above-described noise mixing, the processor 150 may form mixed training data ($\hat{x}$, $\hat{y}$) by mixing clean label data (($x_c$, $y_c$)∈$S_c$) and noisy training data ((x, y)∈S) as shown in Equation 5.

$$\hat{x} = \lambda x + (1-\lambda)x_C \quad \text{[Equation 5]}$$
$$\hat{y} = \lambda y + (1-\lambda)y_C.$$

In this case, λ may be a mixup coefficient determined as "λ~Beta(α, 1)".

Noise mixing training using ($\hat{x}$, $\hat{y}$) in 5 not only enables normalized learning of clean label data through mixup, but also reflects re-weighting effects of label noise data by mixing only clean label data.

According to an embodiment of the inventive concept, the processor 150 may consist of one or more cores, and may include a processor for data analysis and deep learning such as a central processing unit (CPU), a general purpose graphics processing unit (GPGPU), a tensor processing device (TPU) of a computing device. In detail, the processor 150 may include the label noise classification unit 110 and the classifier learning unit 130. The processor 150 may read a computer program stored in the memory 170 and may process data for machine learning according to an embodiment of the inventive concept. According to an embodiment of the inventive concept, the processor 150 may perform an operation for learning a neural network. The processor 150 may perform computations for neural network learning such as processing of input data for learning in deep learning (DL), feature extraction from the input data, error computations, or updating weights of a neural network using backpropagation. Although not shown in drawings, the processor 150 according to an embodiment of the inventive concept may select label noise by inputting noisy training data including clean label data and label noise data into a neural network model, and may learn a classifier by mixing the label noise data and the clean label data.

The neural network model may be a deep neural network. In an embodiment of the inventive concept, a neural network, a network function, and a neural network may be used with the same meaning. A deep neural network (DNN) may refer to a neural network that includes a plurality of hidden layers in addition to an input layer and an output layer. Latent structures of data may be identified by using the DNN. In other words, the latent structures (e.g., an object in the photo, the content and emotion of the text, and the content and emotion of the voice) of a photo, a text, a video, a voice, and music may be identified. The DNN may include a convolutional neural network (CNN), a recurrent neural network (RNN), a restricted Boltzmann machine (RBM), a deep belief network (DBN), a Q network, a U network, and a Siamese network.

The CNN is a type of DNN and includes a neural network including a convolutional layer. The CNN is a type of multilayer perceptrons designed to use minimal preprocessing. The CNN may consist of one or several convolutional layers and artificial neural network layers combined with the convolutional layers The CNN may additionally utilize weights and pooling layers. This structure allows the CNN to fully utilize input data having a two-dimensional structure. The CNN may be used to recognize an object in an image. The CNN may process image data by converting image data into as a matrix with a dimension. For example, in case of image data encoded for each red-green-blue (RGB), each of R, G, and B colors may be represented as a two-dimensional matrix (e.g., in case of a two-dimensional image). In other words, a color value of each pixel of image data may be a component of a matrix, and a size of the matrix may be the same as a size of an image. Accordingly, the image data may be expressed as three two-dimensional matrices (3-dimensional data array).

In the CNN, a convolutional process (the input and output of a convolutional layer) may be performed by multiplying a convolutional filter and a matrix component at each location of an image while a convolutional filter is moved. The convolutional filter may be composed of an n*n matrix. The convolutional filter may be composed of fixed-type filters of which the number is generally smaller than the total number of pixels in an image. In other words, when an image of m*m is input to a convolutional layer (e.g., a convolutional layer having a convolutional filter size of n*n), a matrix representing n*n pixels including each of pixels of the image may be expressed by multiplying the convolutional filter by a component of each of the pixels (i.e., the product of each component of a matrix). A component that matches the convolutional layer may be extracted from the image through the product of the convolutional filter. For example, a 3*3 convolutional filter for extracting vertical line components from an image may include [[0,1,0], [0,1,0], [0,1,0]]. When the 3*3 convolutional filter for extracting the vertical line components from the image is applied to the input image, the vertical line components that match the convolutional filter may be extracted and output from the image. The convolutional layer may apply the convolutional filter to each matrix (i.e., for R, G, and B coded images, R, G, B colors) for each channel representing an image. The convolutional layer may apply a convolutional filter to the input image and extract features that match the convolutional filter from the input image. A filter value (i.e., a value of each component of a matrix) of the convolutional filter may be updated by backpropagation during the learning process of the CNN.

A sub-sampling layer is connected to an output of the convolutional layer to simplify the output of the convolutional layer and to reduce memory usage and computation. For example, when the output of the convolutional layer is input to a pooling layer having a 2*2 max pooling filter, an image may be compressed by outputting the maximum value included in each patch for each 2*2 patch in each pixel of the image. The above-described pooling may be a method of outputting a minimum value in the patch or an average value of the patch, and any pooling method may be included in the inventive concept.

The CNN may include one or more convolutional layers and sub-sampling layers. The CNN may extract features from an image by repeatedly performing the convolutional process and sub-sampling process (e.g., the above-mentioned max pooling, etc.). The neural network may extract global features of the image through an iterative convolutional process and sub-sampling process.

The output of the convolutional layer or the sub-sampling layer may be input to a fully connected layer. The fully connected layer is a layer in which all neurons in one layer are connected to all neurons in neighboring layers. The fully connected layer may refer to a structure in a neural network where all nodes of each layer are connected to all nodes of other layers.

At least one of the CPU, GPGPU, and TPU of the processor 150 may process learning of the network function. For example, the CPU and the GPGPU may process learning of a network function and data classification using the network function, together. Also, in an embodiment of the inventive concept, the CPU and the GPGPU may process learning of the network function and data classification using the network function by using the processor of a plurality of computing devices. Also, a computer program executed in a computing device according to an embodiment of the inventive concept may be a program capable of executing the CPU, the GPGPU, or the TPU.

The memory 170 may store a computer program for providing a noise label learning method, and the stored computer program may be read and driven by the processor 150. The memory 170 may store any type of information generated or determined by the processor 150 and any type of information received by the communication unit 190.

The memory 170 may store data supporting various functions of the noise label learning apparatus 100, and a program for an operation of the processor 150, may store input/output data (e.g., noisy training data, etc.), and may store a plurality of application programs (or applications) running on the noise label learning apparatus 100, data for operation of the noise label learning apparatus 100, and instructions. At least part of the application programs may be downloaded from an external server through wireless communication.

The memory 170 may include the type of a storage medium of at least one of a flash memory type, hard disk type, a Solid State Disk (SSD) type, a Silicon Disk Drive (SDD) type, a multimedia card micro type, a memory of a card type (e.g., SD memory, XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disc. Furthermore, the memory may be separate from the apparatus, but may be a database connected by wire or wirelessly.

The communication unit 190 may include one or more components capable of communicating with an external device, and may include, for example, at least one of a broadcast reception module, a wired communication module, a wireless communication module, a short-range communication module, and a location information module.

Although not illustrated, the noise label learning apparatus 100 according to an embodiment of the inventive concept may further include an output unit and an input unit.

The output unit may display a user interface (UI) for providing label noise selection results and learning results. The output unit may output any type of information generated or determined by the processor 150 and any type of information received by the communication unit 190.

The output unit may include at least one of a liquid crystal display (LCD), a thin film transistor-liquid crystal display (TFT LCD), an organic light emitting diode (OLED), a flexible display, and a 3D display. Some display modules thereof may be implemented with a transparent display or a light-transmitting display such that a user sees the outside through the display modules. This may be called a transparent display module, and a typical example of the transparent display module includes a transparent OLED (TOLED).

The input unit may receive information entered by the user. The input unit may include keys and/or buttons on a user interface for receiving information entered by a user, or physical keys and/or buttons. A computer program for controlling a display according to an embodiment of the inventive concept may be executed depending on a user input through an input unit.

Figure 4:
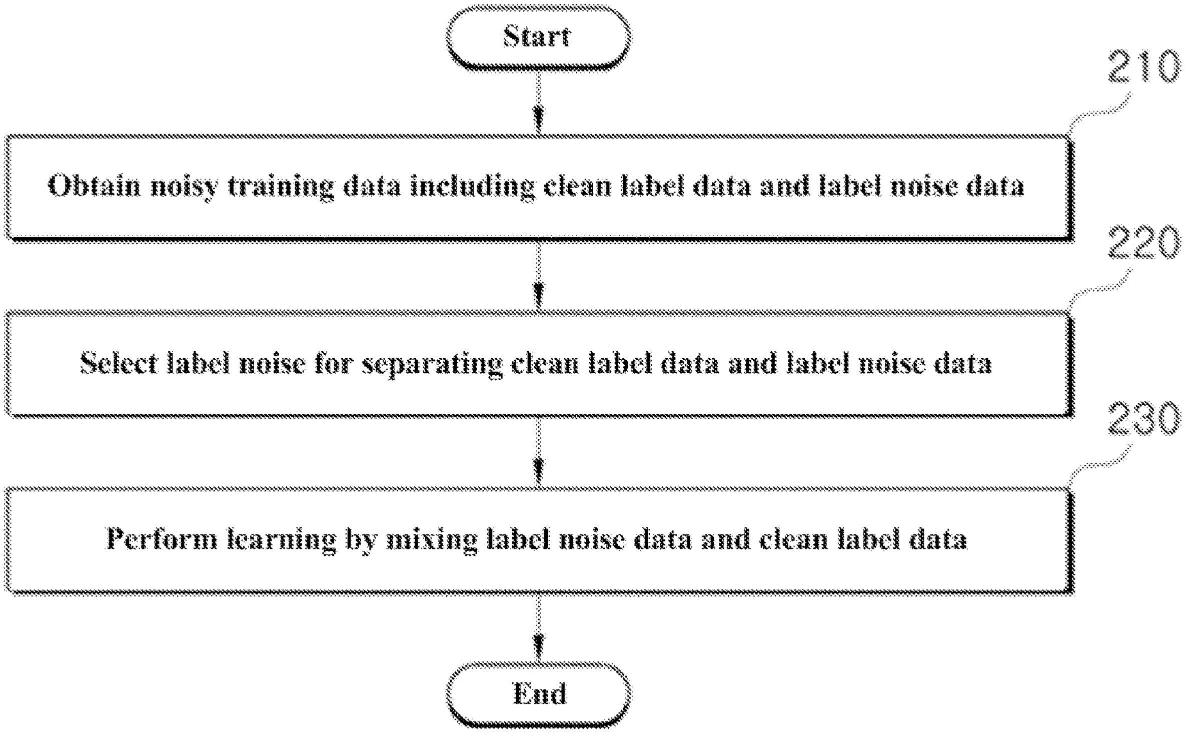
FIG. 4 is a flowchart of a noise label learning method, according to an embodiment of the inventive concept.

FIG. 4 is a flowchart of a noise label learning method, according to an embodiment of the inventive concept.

The processor 150 of the noise label learning apparatus 100 may obtain noisy training data including clean label data and label noise data through the label noise classification unit 110 (210). The label noise data may refer to mislabeled data. The clean label data may refer to data that is correctly labeled.

Next, the processor 150 of the noise label learning apparatus 100 may separate clean label data and label noise data from noisy training data through the label noise classification unit 110 and then may select label noise for searching for mislabeled data (220).

In this case, the processor 150 may train a weak classifier for the noisy training data through the label noise classification unit 110, may predict augmented training data by using the trained weak classifier, may calculate a prediction score by using weak classifier prediction of augmented training data, and may select label noise data from noisy training data depending on the calculated prediction score. The prediction score for separating the clean label data and the label noise data may be test-time augmentation cross entropy.

Next, the processor 150 of the noise label learning apparatus 100 may learn a classifier by mixing noisy training data and clean label data at a predetermined ratio through the classifier learning unit 130 (230).

In this case, the processor 150 may mix the clean label data and the noisy training data, which are separated through label noise selection and then may form mixed training data.

Figure 5:
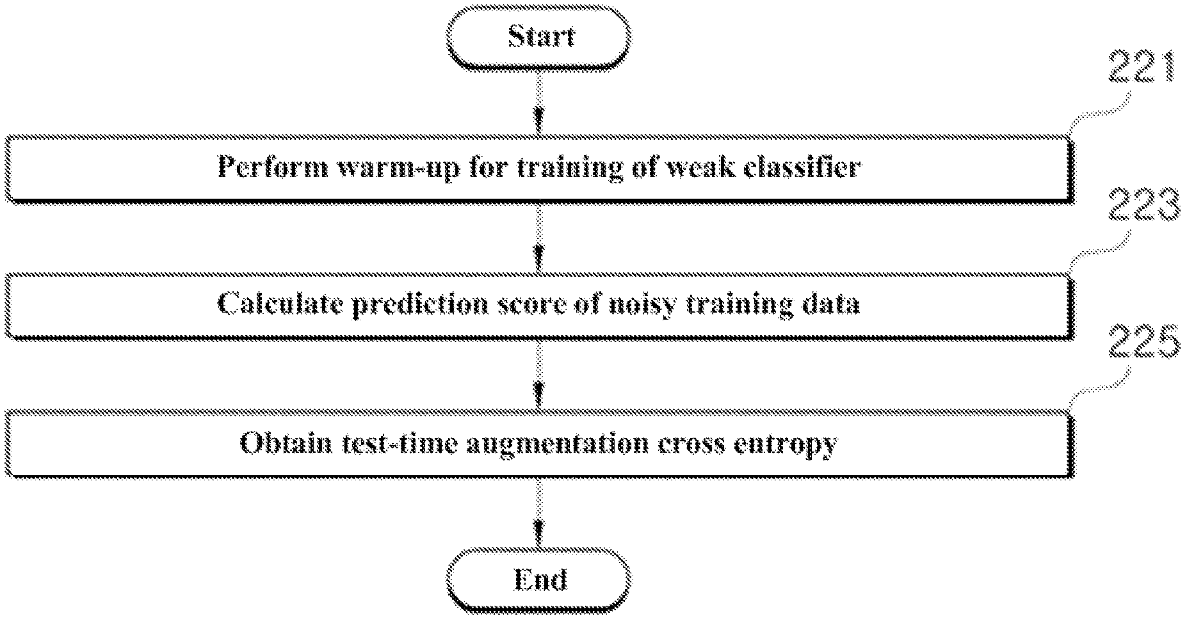
FIG. 5 is a flowchart for describing a label noise selection method, according to an embodiment of the inventive concept; and, FIGS. 6A to 6C and 7A to 7C are diagrams for describing experimental results, according to an embodiment of the inventive concept.

FIG. 5 is a flowchart for describing a label noise selection method according to an embodiment of the inventive concept, and is a diagram for describing step 220 described above in more detail.

First of all, the processor 150 of the noise label learning apparatus 100 may perform warm-up for training of a weak classifier to obtain a prediction score of noisy training data through the label noise classification unit 110 (221).

In this case, the processor 150 may train the noisy training data for a predetermined number (e.g., 2 epochs in FIG. 3) of epochs. This may be intended to prevent a weak classifier fw( ) from being overfitted to a classifier due to incorrect label noise. Here, one epoch means that an artificial neural network performs a forward pass/backward pass process on the entire data set, and may refer to a state where learning is completely made once on the entire data set.

Next, the processor 150 may calculate the prediction score of noisy training data for separating label noise data and clean label data by using a trained weak classifier through the label noise classification unit 110 (223).

In this case, the processor 150 may perform the prediction of a weak classifier based on augmented training data included in the noisy training data through affine transformation-based test-time augmentation. This is intended to prevent the weak classifier from still remembering label noise data even after the above-mentioned warm-up process.

When performing the prediction of a weak classifier based on the augmented training data described above, the processor 150 may form a set of augmented training data by using an affine transformation from a pair of image labels of noisy training data through the label noise classification unit 110. Moreover, the processor 150 may obtain a predicted label set by performing the prediction of a weak classifier based on the set of augmented training data.

Next, the processor 150 may obtain test-time augmentation cross entropy for distinguishing between label noise data and clean label data based on the prediction score of the noisy training data calculated through the label noise classification unit 110 (225).

When obtaining the test-time augmentation cross entropy described above, the processor 150 may calculate the prediction score by using the prediction of the weak classifier of augmented training data. Besides, the processor 150 may select label noise data from noisy training data depending on the prediction score.

Also, when obtaining test-time augmentation cross entropy, the processor 150 may determine the accuracy of the training label of the noisy training data by forming a probability distribution of the unique label for training labels of the noisy training data through the label noise classification unit 110.

FIGS. 6A to 6C and 7A to 7C are diagrams for describing experimental results, according to an embodiment of the inventive concept.

Hereinafter, it will be described that a method according to an embodiment of the inventive concept is applied when a public dermoscopic skin lesion diagnosis data set of ISIC-18 [13,4,2,1,3] is verified.

The ISIC-18 data set may be composed of 10,208 dermoscopic skin lesion images for 7 skin diseases, such as 10,015 images for training and 193 images for verification.

Figure 6A:
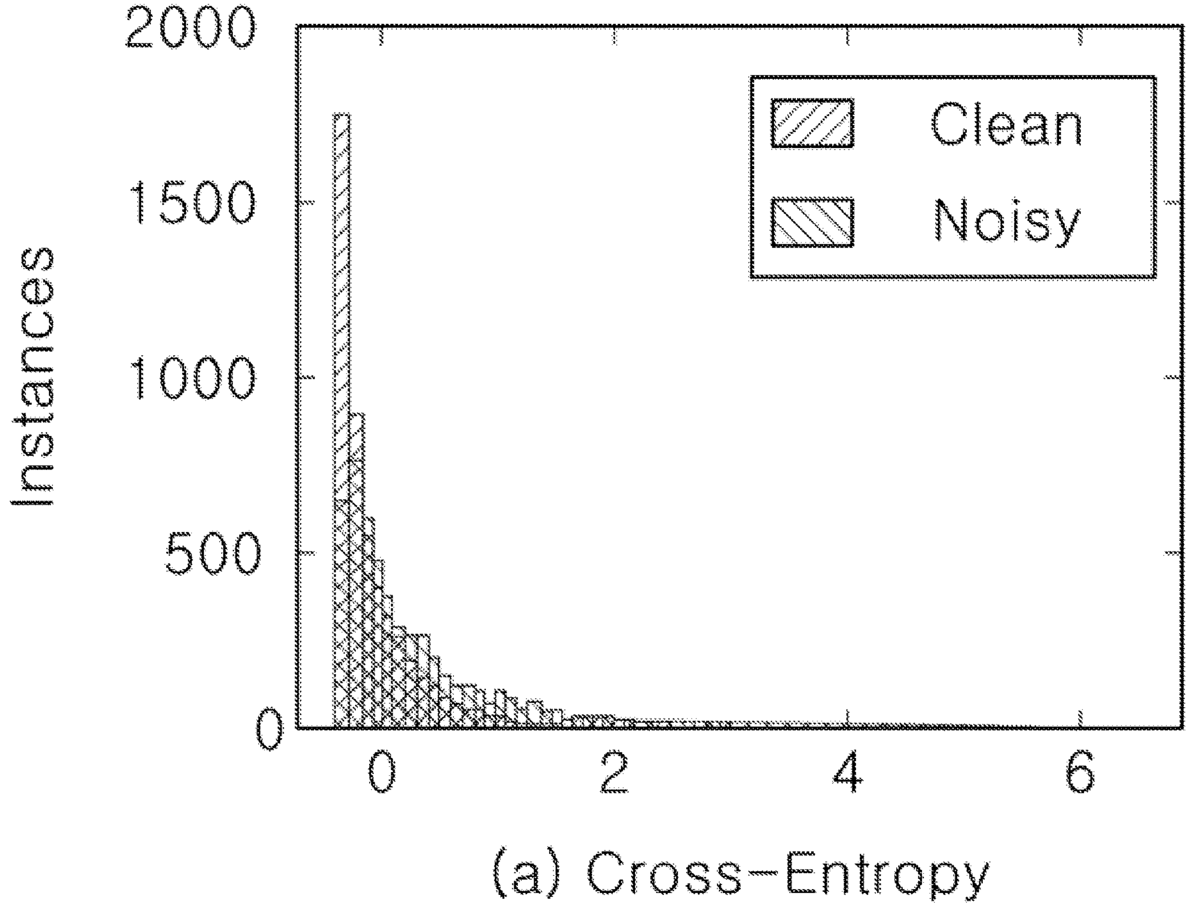
Figure 6B:
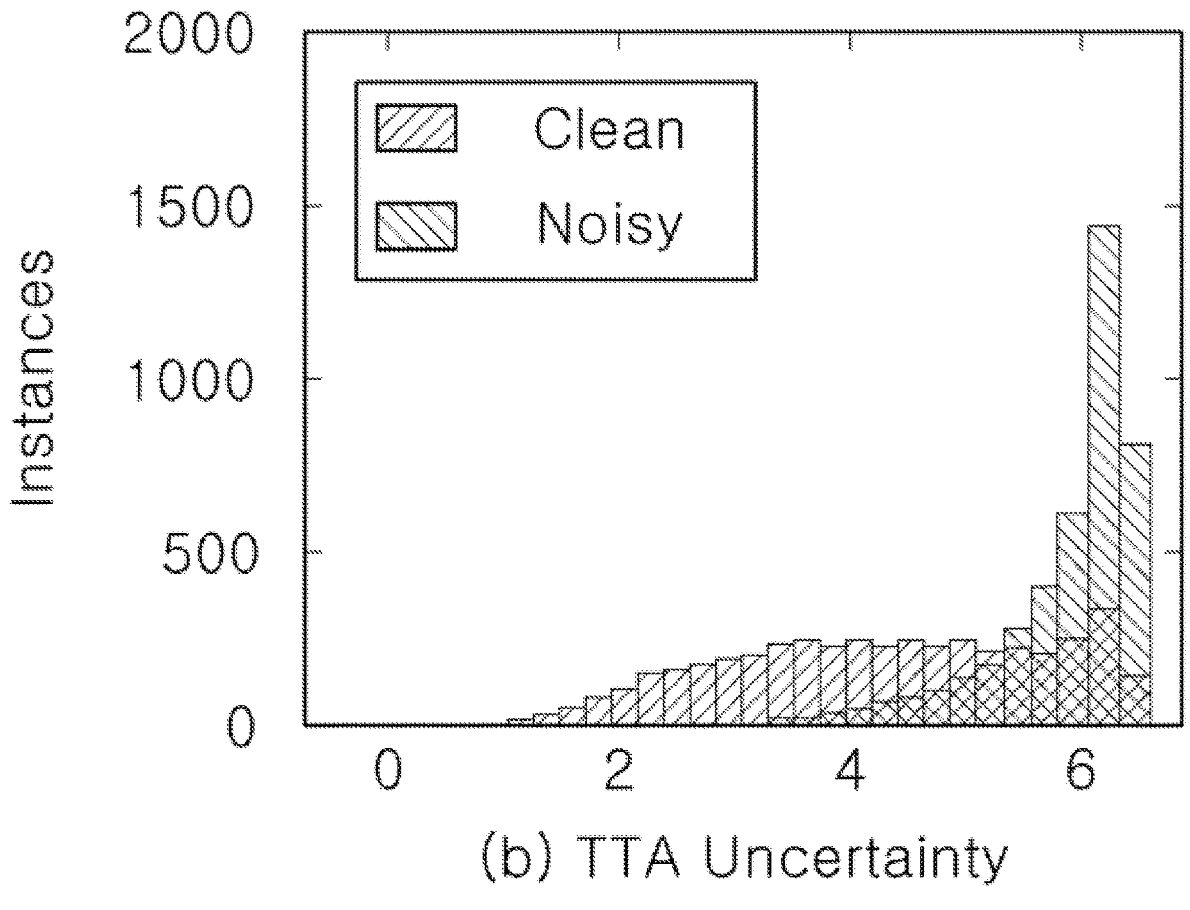
Figure 6C:
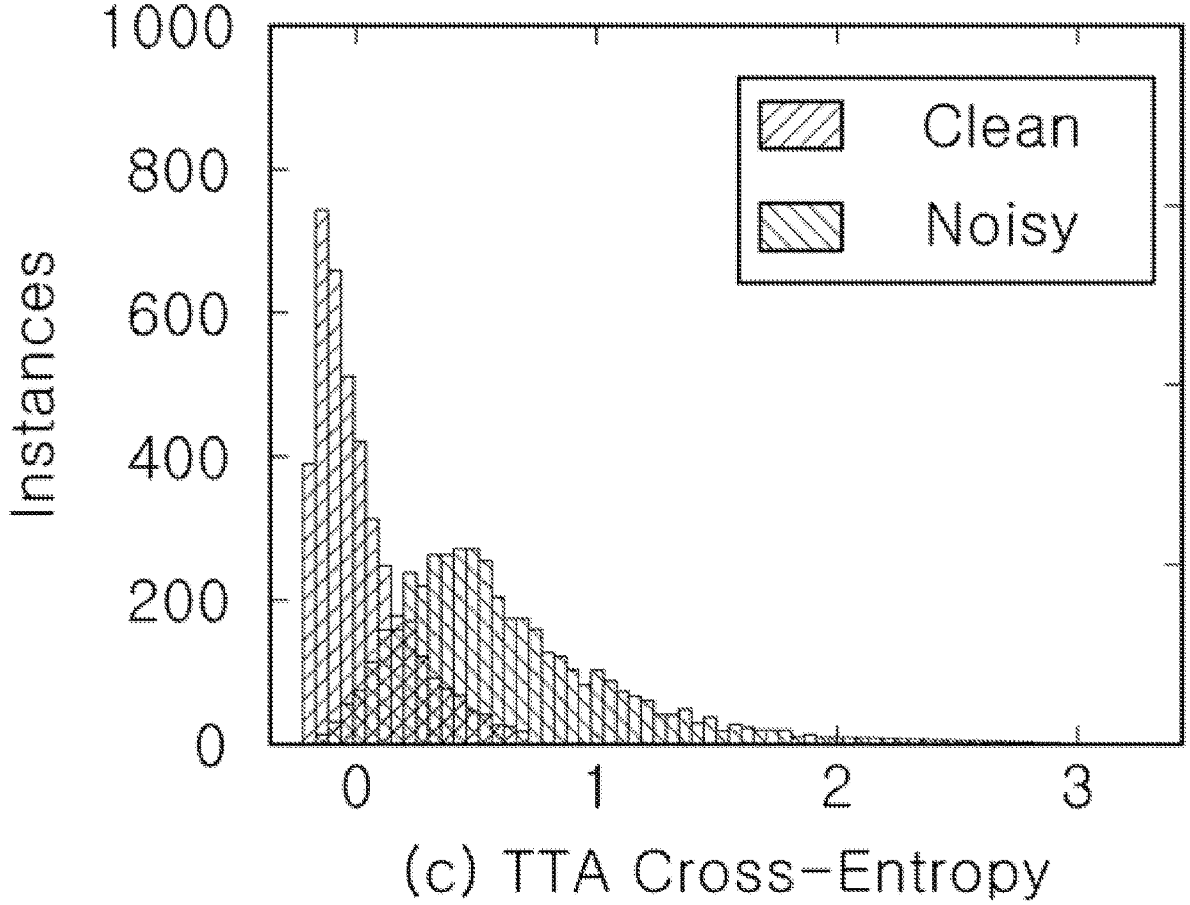

FIGS. 6A to 6C show a histogram of various prediction scores for label noise data and clean label data based on the above-described data set. FIG. 6A shows a case where cross-entropy is applied; FIG. 6B shows a case where test-time augmentation uncertainty is applied; and, FIG. 6C shows a case where the test-time augmentation cross entropy according to an embodiment of the inventive concept is applied.

Referring to FIGS. 6A to 6C, it may be seen that the distribution of test-time augmentation cross entropy in the method according to an embodiment of the inventive concept of FIG. 6C is obtained by mixing the cross-entropy of clean label data and the uncertainty of test-time augmentation of label noise data. According to an embodiment of the inventive concept, it may be seen that a distribution in FIG. 6C has a prediction score that is easier to distinguish between label noise data and clean label data because a distribution in FIG. 6C is shorter than a distribution in FIG. 6A or 6B and the degree of overlap between the distributions is small.

Figure 7A:
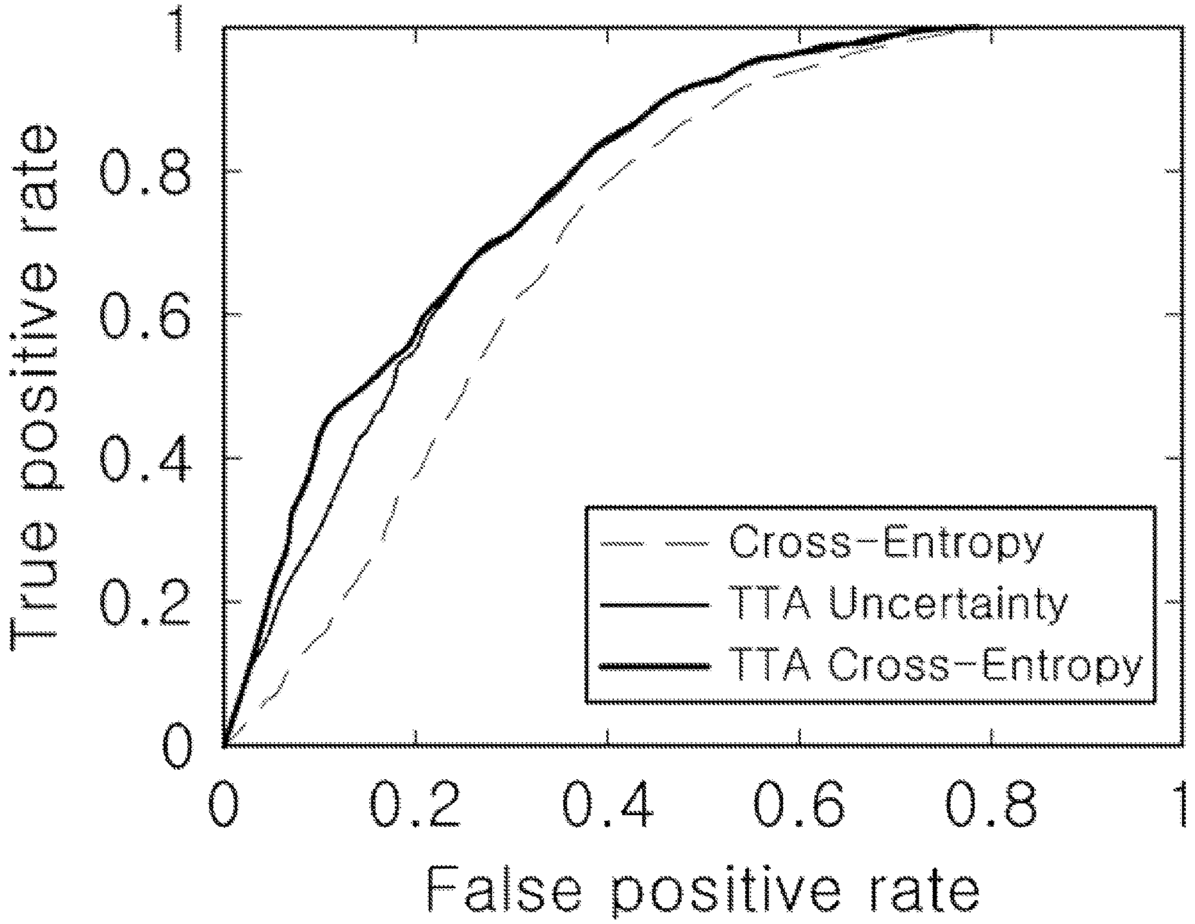
Figure 7B:
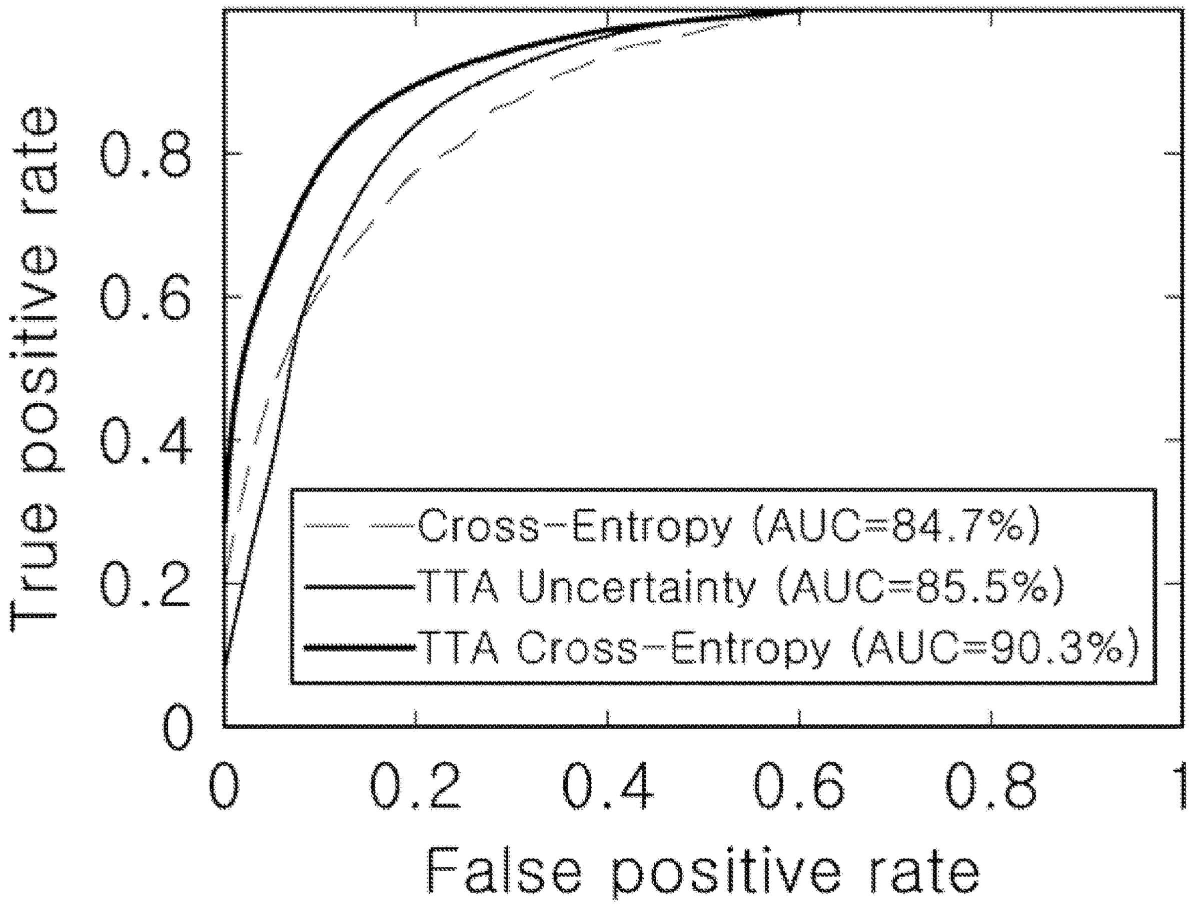
Figure 7C:
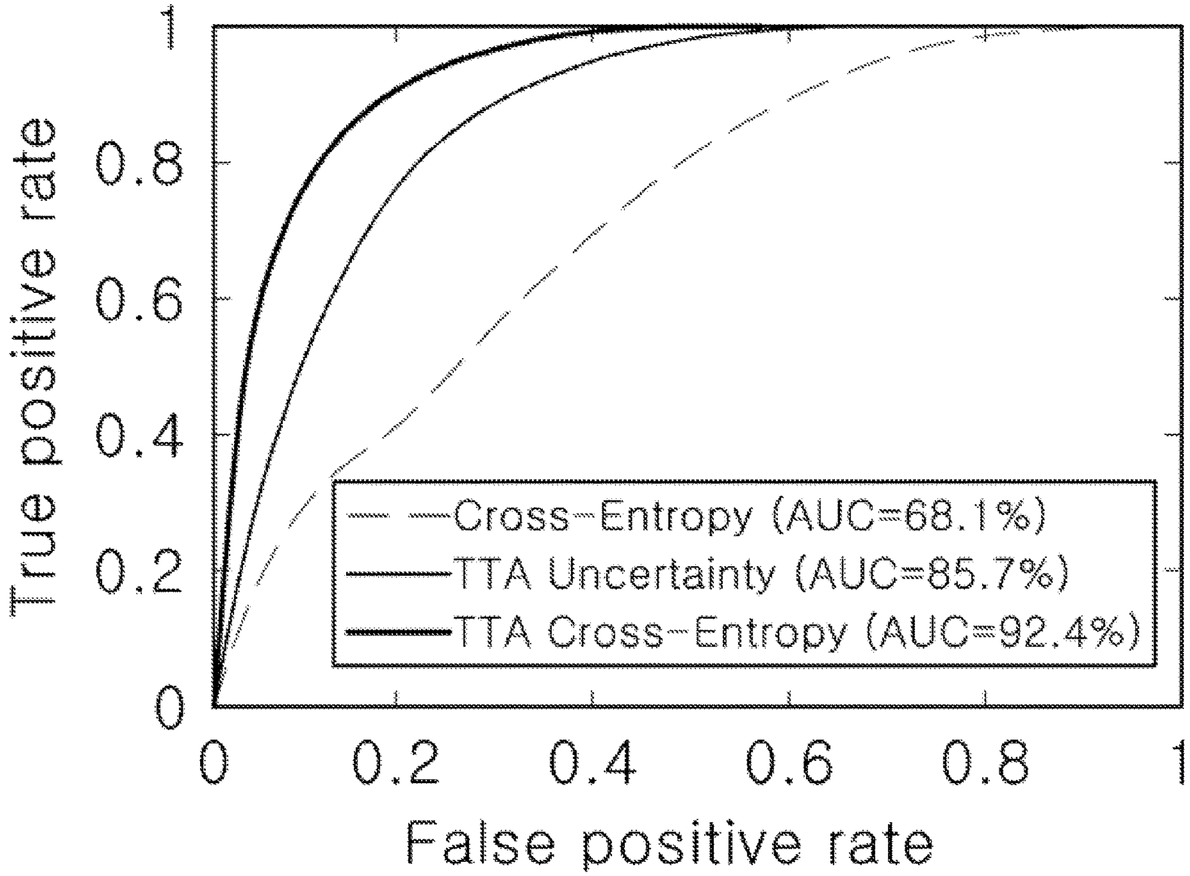

FIGS. 7A to 7C show an ROC curve and AUC of a proposal for detecting label noise data and a comparative label noise selecting method.

In detail, FIGS. 7A to 7C show ROC curves of cross-entropy, test-time augmentation uncertainty, and test-time augmentation cross entropy according to an embodiment of the inventive concept for detecting label noise data in a label noise selecting process with a different label noise ratio 'r'.

It may be seen that label noise selection using cross-entropy in FIG. 7A indicates low detection performance in separating label noise data and clean label data. In the case, a network may be easily overfitted in similar shapes in medical images because the cross-entropy is vulnerable to the memorization problem of the overfitted weak classifier. The memorization problem may be generally avoided by applying the uncertainty of the test-time augmentation of FIG. 7B. According to an embodiment of the inventive concept, it may be seen that the detection performance of label noise data is relatively high regardless of the label noise ratio 'r' in the test-time augmentation cross entropy in FIG. 7C.

In the meantime, the method according to an embodiment of the inventive concept may be implemented by a program (or an application) and may be stored in a medium such that the program is executed in combination with a server being hardware.

The disclosed embodiments may be implemented in a form of a recording medium storing instructions executable by a computer. The instructions may be stored in a form of program codes, and, when executed by a processor, generate a program module to perform operations of the disclosed embodiments. The recording medium may be implemented as a computer-readable recording medium.

The computer-readable recording medium may include all kinds of recording media in which instructions capable of being decoded by a computer are stored. For example, there may be read only memory (ROM), random access memory (RAM), magnetic tape, magnetic disk, flash memory, optical data storage device, and the like.

Disclosed embodiments are described above with reference to the accompanying drawings. One ordinary skilled in the art to which the inventive concept belongs will understand that the inventive concept may be practiced in forms other than the disclosed embodiments without altering the technical ideas or essential features of the inventive concept. The disclosed embodiments are examples and should not be construed as limited thereto.

According to the above-mentioned problem solving means of the inventive concept, the performance of detecting uncertain label noise, which is mislabeled, may be improved by applying test-time augmentation cross entropy.

Moreover, according to an embodiment of the inventive concept, a mixing ratio of label noise data may be adjusted during noise mixing learning, thereby improving the performance of a classifier on label noise.

Furthermore, according to an embodiment of the inventive concept, because machine learning is based on training data with reduced label noise, training data may be accurately predicted, thereby improving the performance of machine learning.

Effects of the inventive concept are not limited to the effects mentioned above, and other effects not mentioned will be clearly understood by those skilled in the art from the following description.

While the inventive concept has been described with reference to embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A method for noise label learning based on noise data and separating clean label data, performed by an apparatus, the method comprising:

obtaining noisy training data including the clean label data and label noise data;

selecting label noise for searching for mislabeled data by separating the clean label data and the label noise data from the noisy training data;

learning a first classifier by mixing the noisy training data and the clean label data at a predetermined ratio, wherein the selecting of the label noise includes:

training a second classifier for the noisy training data, for a predetermined number of epochs, wherein one epoch is one forward pass/backward pass process on an entire data set by an artificial neural network;

calculating a prediction score by predicting augmented training data by using the second classifier; and selecting the label noise data from the noisy training data depending on the prediction score, and wherein the prediction score for separating the clean label data and the label noise data is test-time augmentation cross-entropy, which is calculated by computing cross-entropy between a predictive probability distribution, output by the second classifier, and a training label probability distribution for a plurality of input samples augmented at test time; and classifying the clean label data and the label noise data by using the first classifier.

2. The method of claim 1, wherein the calculating of the prediction score includes:

performing prediction of the second classifier based on the augmented training data included in the noisy training data through test-time augmentation based on an affine transformation.

3. The method of claim 2, wherein the performing of the prediction of the second classifier includes:

forming a set of the augmented training data by using the affine transformation from a pair of image labels of the noisy training data; and obtaining a predicted label set by performing the prediction of the second classifier based on the set of augmented training data.

4. The method of claim 3, wherein the obtaining of the test-time augmentation cross-entropy includes:

calculating the prediction score by using the prediction of the second classifier of the augmented training data; and selecting the label noise data from the noisy training data depending on the prediction score.

5. The method of claim 4, wherein the obtaining of the test-time augmentation cross-entropy includes:

identifying accuracy of a training label of the noisy training data by forming a probability distribution of unique labels for the training label of the noisy training data.

6. The method of claim 1, wherein the learning of the first classifier by mixing the noisy training data and the clean label data at the predetermined ratio includes:

forming mixed training data by mixing the clean label data and the noisy training data separated by selecting the label noise.

7. A apparatus for noise label learning based on noise data and separating clean label data, the apparatus comprising:

a processor; and a memory configured to store a program executed by the processor, wherein the processor is configured to:

obtain noisy training data including the clean label data and label noise data;

select label noise for searching for mislabeled data by separating the clean label data and the label noise data from the noisy training data, by performing:

training a second classifier for the noisy training data, for a predetermined number of epochs, wherein one epoch is one forward pass/backward pass process on an entire data set by an artificial neural network;

calculating a prediction score by predicting augmented training data by using the second classifier; and selecting the label noise data from the noisy training data depending on the prediction score, wherein the prediction score for separating the clean label data and the label noise data is test-time augmentation cross-entropy, which is calculated by computing cross-entropy between a predictive probability distribution, output by the second classifier, and a training label probability distribution for a plurality of input samples augmented at test time;

learn a first classifier by mixing the noisy training data and the clean label data at a predetermined ratio; and classify the clean label data and the label noise data by using the first classifier.

8. The apparatus of claim 7, wherein, when calculating the prediction score of the noisy training data, the processor is configured to:

perform prediction of the second classifier based on the augmented training data included in the noisy training data through test-time augmentation based on an affine transformation.

9. The apparatus of claim 8, wherein, when performing the prediction of the second classifier based on the augmented training data, the processor is configured to:

form a set of the augmented training data by using the affine transformation from a pair of image labels of the noisy training data; and obtain a predicted label set by performing the prediction of the second classifier based on the set of augmented training data.

10. The apparatus of claim 9, wherein, when obtaining the test-time augmentation cross-entropy, the processor is configured to:

calculate the prediction score by using the prediction of the second classifier of the augmented training data; and select the label noise data from the noisy training data depending on the prediction score.

11. The apparatus of claim 10, wherein, when obtaining the test-time augmentation cross-entropy, the processor is configured to:

identify accuracy of a training label of the noisy training data by forming a probability distribution of unique labels for the training label of the noisy training data.

12. The apparatus of claim 7, wherein, when learning the first classifier by mixing the noisy training data and the clean label data at the predetermined ratio, the processor is configured to:

form mixed training data by mixing the clean label data and the noisy training data separated by selecting the label noise.

* * * * *